United States Patent
Surender et al.

(10) Patent No.: US 7,413,726 B2
(45) Date of Patent: Aug. 19, 2008

(54) SYNTHESIS OF ULTRAFINE RUTILE PHASE TITANIUM DIOXIDE PARTICLES

(75) Inventors: Gerald D. Surender, Thiruvananthapuram (IN); Ani K. John, Thiruvananthapuram (IN); Kumara P. Rajendra Prasad, Thiruvananthapuram (IN); Savithri Sivaraman, Thiruvananthapuram (IN)

(73) Assignee: Council of Scientific and Industrial Research, New Delhi (IN)

( * ) Notice: Subject to any disclaimer, the term of this patent is extended or adjusted under 35 U.S.C. 154(b) by 771 days.

(21) Appl. No.: 10/811,505

(22) Filed: Mar. 26, 2004

(65) Prior Publication Data

US 2005/0214200 A1  Sep. 29, 2005

(51) Int. Cl.
*C01G 23/047* (2006.01)
*C01G 23/00* (2006.01)
*C09C 1/36* (2006.01)
*C22B 34/10* (2006.01)

(52) U.S. Cl. .......... 423/614; 423/76; 423/610; 423/612; 423/613; 106/436; 106/437

(58) Field of Classification Search ............ 423/76, 423/610, 612, 613, 614; 106/436, 437
See application file for complete search history.

(56) References Cited

U.S. PATENT DOCUMENTS

| | | | | |
|---|---|---|---|---|
| 1,842,620 A | * | 1/1932 | McInerny et al. | 423/613 |
| 1,931,380 A | * | 10/1933 | Haber et al. | 423/613 |
| 2,968,537 A | * | 1/1961 | Nixon | 23/293 R |
| 3,409,501 A | * | 11/1968 | Siuta | 162/166 |
| 4,241,042 A | * | 12/1980 | Matijevic et al. | 423/610 |
| 4,574,078 A | * | 3/1986 | Cortesi et al. | 423/608 |
| 4,803,064 A | * | 2/1989 | Montino et al. | 423/612 |
| 4,842,832 A | * | 6/1989 | Inoue et al. | 423/21.1 |
| 5,698,177 A | * | 12/1997 | Pratsinis et al. | 423/613 |
| 5,846,511 A | * | 12/1998 | Kim et al. | 423/610 |
| 6,548,039 B1 | * | 4/2003 | Duyvesteyn et al. | 423/610 |
| 2002/0003590 A1 | | 1/2002 | Ko et al. | |

FOREIGN PATENT DOCUMENTS

WO    WO-98/04500 A1    2/1998

OTHER PUBLICATIONS

Bin Xia, Weibin Li, Bin Zhang, Youchang Xie, Low temperature vapor-phase preparation of TiO2 nanopowders, 1999, Journal of Materials Science, 34, 3505-3511 Xia et al.*
F. Rubio, J. Rubio, P. Duran, J. L. Oteo, Preparation of nanometric titanium hydrous oxide particles by vapour phase hydrolysis of titanium tetrabutoxide, 1999, Journal of Materials Science, 34, 3397-3404 Rubio et al.*
Karsten Wegner, Sotiris E. Pratsinis, Nozzle-Quenching Process for Controlled Flame Synthesis of Titania Nanoparticles, Jul. 2003, AIChE Journal, vol. 49, No. 7, 1667-1675 Wegner et al.*

(Continued)

*Primary Examiner*—Timothy C. Vanoy
*Assistant Examiner*—Serena L Hanor
(74) *Attorney, Agent, or Firm*—Darby & Darby

(57) ABSTRACT

The present invention provides a low temperature process for the synthesis of ultrafine rutile phase titanium dioxide particles through vapor phase hydrolysis of titanium tetra chloride.

20 Claims, 2 Drawing Sheets

OTHER PUBLICATIONS

P.P. Ahonen, O. Richard, E.I. Kauppinen, Particle production and anatase formation in amorphous particles at in-droplet hydrolysis of titanium alkoxide, 2001, Materials Research Bulletin, 36, 2017-2025 Richard et al.*

P.P. Ahonen, U. Tapper, E.I. Kauppinen, J.-C. Joubert, J.-L. Deschanvres, Aerosol synthesis of Ti—O powders via in-droplet hydrolysis of titanium alkoxide, 2001, Materials Science and Engineering, A315, 113-121 Ahonen et al.*

* cited by examiner

Scale Factor 1:1

SYNTHESIS OF ULTRAFINE RUTILE PHASE TITANIUM DIOXIDE PARTICLES

FIELD OF THE INVENTION

The present invention relates to a low temperature process for the synthesis of ultrafine rutile phase titanium dioxide particles through vapor phase hydrolysis of titanium tetra chloride. In particular the present invention relates to a method for the manufacture of rutile grade titanium dioxide powder using ethanol as dopant to bring down the rutile formation temperature to as low as 150-400° C. during calcination with time duration of 1 to 4 hrs. The process includes a novel combination of operational steps to economically produce ultrafine titanium dioxide powders of rutile phases in a flexible manufacturing process.

BACKGROUND OF THE INVENTION

Titanium dioxide (titania) is extensively used as pigments, catalysts, inorganic membranes, semi-conductors, optical coating reagent and as photocatalysts in water purification process. Titanium dioxide ($TiO_2$) has two phases of crystalline structure of industrial importance, namely, anatase and rutile. Titanium dioxide with anatase phase has been used as a photocatalyst for photodecomposition of acetone, phenol or trichloro ethylene, oxidation such as nitrogen mono-oxide and nitrogen dioxide and conversion system using solar energy due to its high photo-activity. Titanium dioxide with rutile phase has been widely used as white pigment because of its good scattering effect that protects the ultraviolet light. It has also been used in optical coatings, beam splitter and anti-reflection coatings since it has a high dielectric constant and high refractive index, good oil absorption ability, tinting power and chemical stability even under strongly acidic or basic conditions. Titanium dioxide shows different electrical characteristics according to oxygen partial pressure since it has wide chemical stability and non-stoichiometric phase region. Because of this, it can also be used as a humidity sensor and as high-temperature oxygen sensor and the field of its use has become wide.

Titanium dioxide powders for pigment use generally have an average particle size of 150 to 250 nanometer and is considered the principal white pigment of commerce. It has an exceptionally high refractive index, negligible color and is quite inert. Titanium dioxide having a smaller average particle size, for instance in the 10 to 100 nanometer median particle size range, is used commercially in cosmetics and personal care products, plastics, surface coating, self—cleaning surfaces, and photo voltaic applications. This grade of titanium dioxide is referred to as ultrafine or nano-sized titanium dioxide. More than four million tons of titanium dioxide are produced annually; there are several processes for making ultrafine titanium dioxide, some in commercial use and some in development. Some use anhydrous titanium dioxide. Some use anhydrous titanium tetrachloride as a feed stock. Another process uses a titanyl sulfate solution as the feed stock.

Generally, titanium dioxide powders are manufactured by a chloride process, which is a gas phase process, or by a sulfate process, which is a liquid phase process.

In the chloride process, which was commercialized by Du Pont of USA in 1956, titanium tetrachloride is used as a starting material and the reaction temperature needs to be higher than 1,000° C. This method also requires extra protection devices because of the corrosive $Cl_2$ gas product at high temperature in the process, leading to higher production costs. Because titanium dioxide powders produced by the chloride process are fine but rough, additive equipment for providing external electrical fields or controlling reactant mixing ratios are required to control the particle shape and size of titanium dioxide powders. High pure oxygen is required for oxidation of $TiCl_4$ and that leads to high capital and operating costs.

In the sulfate process, which was commercialized by Titan company of Norway in 1961, titanium sulfate ($TiSO_4$) is conventionally hydrolyzed at temperatures higher than 100° C., calcined at 800-1000° C. and then pulverized to produce titanium dioxide powders. During the calcination and pulverization processes, impurities are introduced causing the quality of the final titanium dioxide powder to be low.

Funaki, Saeki, et al. in Kogyo Kagaku Zasshi, 59 (11), pp. 1291 (1956), teach that fine particles of anatase-type titanium dioxide can be produced by mixing titanium tetrachloride and water in the vapor phase, at a temperature in the range from 200° C. to 800° C. or fine particles of anatase-type titanium dioxide containing or not containing a very small amount of rutile-type particles can be produced by the reaction of titanium tetrachloride and water in the liquid phase and a much higher temperature treatment to obtain rutile phase titanium dioxide.

A method for preparing spherical particles of a metal oxide comprising hydrolysis of a hydrolysable titanium (IV) compound in the form of a liquid aerosol by being contacted with water vapor in a dynamic flow is taught in U.S. Pat. No. 4,241,042. A method in which a precursor of a metal oxide in the form of a very fine droplet suspension of the liquid is heated and gasified by evaporation and thermal decomposition and then contacted and reacted with an oxygen containing gas in the vapor phase to give spherical fine particles of a metal oxide is taught in Japanese Patent Kokai 59-107904 and 59-107905.

Recently considerable interest has been directed toward the synthesis of rutile grade titania at low temperature. There have been some reports about new liquid phase processes to synthesize rutile grade titanium dioxide powder using titanium tetrachloride. Kim, Park et al, (U.S. Pat. No. 6,001,326) show a new liquid phase process in which $TiO_2$ precipitates with pure rutile phase having spherical shapes having 200-400 nm in diameter formed between room temperature and 65° C., by the homogeneous precipitation method simply by heating and stirring an aqueous $TiOCl_2$ solution.

Tang et al., (Mater. Chem. Phys. 77 (2): pp. 314, (2003) disclose the preparation of nano-sized rutile $TiO_2$ powder by hydrolysis of Ti ($OC_4H_9$) 4 solution at 40-50° C. When the solution is neutral and basic, the hydrolysis product is a precipitate and the dried precipitate is amorphous. The rutile phase $TiO_2$ cannot be obtained even when the dried precipitate is calcined at 600° C. However, when the solution is acidic, the hydrolysis product is a solid, in order to obtain rutile $TiO_2$ by drying the gel at 40-50° C. However, tight control of reaction conditions is required, since alkoxide is intensely hydrolyzed in air. Furthermore, the high price of the alkoxide limits its commercialization.

Yang et al., (Mater. Chem. Phys., 77 (2): pp. 501, (2003) also reported that titania nanocrystals in the rutile form were prepared in liquid phase at room temperature under normal pressure. Li Y. Z. et al, also reported in Jour. Mater. Chem., 12 (5): pp. 1387, (2002), the preparation of nano-crystalline rutile $TiO_2$ with average crystal sizes of 6.9-10.5 nm by hydrolysis of $TiCl_4$ aqueous solution at lower temperatures. All the above reported techniques of synthesizing rutile phase titanium dioxide are based on liquid phase processing.

In comparison with liquid phase routes, vapor phase hydrolysis of titanium chloride to synthesize anatase has been reported. For example; B. Xia et al. (Jour. Mater. Sci., 34, pp. 3505, (1999), reported the preparation of anatase $TiO_2$ nanopowders by vapor-phase hydrolysis of $TiCl_4$ below 600° C. As an independent preparation route, it hasn't been paid much attention.

Compared with liquid phase process, the vapor phase process carried out in an aerosol reactor offers many advantages including product purity, ease of collection, energy efficiency and avoids treatment like filtration, washing, drying etc., involving large liquid volumes. However, the chloride process is carried out at high temperature and has encountered several problems, such as control of product characteristics, reactor corrosion, and operational problems, mainly due to the high temperatures and corrosive gases involved. Therefore, there is a need for a process to produce ultrafine titanium dioxide at temperature much reduced from those encountered in the chloride process but involving only gas phase processing without involvement of liquids.

OBJECTS OF THE INVENTION

The main objective of the invention is to develop a low temperature process for the synthesis of ultrafine rutile particles through vapor phase hydrolysis of $TiCl_4$.

Another object of the present invention is to develop a flexible low temperature process for the synthesis of anatase, rutile and mixtures thereof in the same reactor system.

SUMMARY OF THE INVENTION

The present invention provides a low temperature process for the synthesis of ultrafine rutile phase titanium dioxide particles through vapor phase hydrolysis of titanium tetrachloride comprising the step of:
 a) hydrolyzing a mixture of $TiCl_4$ and $H_2O$ and a dopant in vapour phase in an aerosol reactor;
 b) collecting amorphous or anatase titanium dioxide powder formed as dry powders;
 c) calcining the dry powder to obtain rutile phase titanium dioxide.

In one embodiment of the invention, the amorphous particles of titanium dioxide are calcined at a temperature in the range of 150 to 400° C. and for a period in the range of 1 to 4 hrs to generate rutile particles.

In another embodiment of the invention, the dopant contains a carbon atom and is selected from the group consisting of an aliphatic alcohol, an aromatic hydrocarbon, and any mixture thereof.

In yet another embodiment of the invention, the dopant is ethanol.

In yet another embodiment of the invention, the molar concentration of the dopant is 1 to 10 based on the water vapour.

In another embodiment of the invention, the reaction mixture contains from 0 to 10% ethanol on a molar basis based on $TiCl_4$.

In another embodiment of the invention, the flow rate of $TiCl_4$ is in the range of 10 $cm^3$/min to 200 $cm^3$/min.

In yet another embodiment of the invention, the $TiCl_4$ vapor concentration inside the reactor is in the range of $7\times10^{-4}$ mol/min to $1\times10^{-2}$ mol/min.

In yet another embodiment of the invention, the flow rate of water vapour is in the range of 240 to 1500 $cm^3$/min, preferably from 500 to 1000 $cm^3$/min.

In one embodiment of the invention, temperature at the exit of the aerosol reactor is maintained at less than 100° C. for obtaining titanium dioxide particles having anatase phase.

In another embodiment of the invention, the aerosol reactor is externally heated in order to avoid particle coating on the walls through thermophoresis.

In yet another embodiment of the invention, the aerosol reactor consists of 3-tube concentric jet assembly wherein $TiCl_4$ is introduced into the innermost tube, dopant is introduced into the outermost tube and water vapor is introduced into the middle tube.

In another embodiment of the invention, the 3-tube assembly comprises a concentric arrangement of three Inconel® tubes at the entrance of the aerosol reactor.

In another embodiment of the invention, the vapor phase $TiCl_4$ is introduced into a center tube of the three concentric Inconel® tubes.

In another embodiment of the invention, the vapor phase $TiCl_4$ is formed by bubbling an inert gas through $TiCl_4$ liquid.

In a further embodiment of the invention, the inert gas is selected from the group consisting of argon, nitrogen, krypton, helium and any mixture thereof.

In yet another embodiment of the invention, the molar ratio of water to titanium tetra chloride in the feed is in the range 10 to 15.

In another embodiment of the invention, the water vapor is formed by bubbling air or inert gases through water under superheated condition.

In another embodiment of the invention, the reactor wall temperature is from 200 to 450° C.

In yet another embodiment of the invention, the rutile titanium dioxide particles formed have an average diameter in the range of from 25 to 150 nanometers.

The present invention also provides a low temperature process for the synthesis of ultrafine rutile phase titanium dioxide particles through vapor phase hydrolysis of titanium tetrachloride comprising the step of:
 a. vaporizing a titanium chloride liquid, water and a dopant comprising ethanol separately to generate a reaction mixture;
 b. hydrolyzing vapor phase $TiCl_4$ and $H_2O$ and dopant mixture in a continuous aerosol reactor under non-isothermal conditions at a temperature in the range of 80 to 135° C.;
 c. collecting amorphous and anatase phase titanium dioxide powder as dry powder;
 d. Calcining the titanium dioxide particles having amorphous phase at a temperature range of 150-400° C. and for a period in the range of 1 to 4 hrs to obtain titanium dioxide particles with rutile phase.

BRIEF DESCRIPTION OF THE DRAWING

In the drawings accompanying this specification.

DETAILED DESCRIPTION OF THE INVENTION

The present invention relates to a gas phase based aerosol synthesis of rutile phase titanium dioxide particles at a much lower temperature so as to avoid the several unit operations needed for the treatment of large liquid volumes and the need for high purity oxygen as in the chloride process. The present invention has successfully led to the development of a new titanium dioxide powder manufacturing method. In this method, it is possible to prepare ultrafine titanium dioxide powders of rutile phase continuously with excellent control of particle characteristics such as particle shape, particle size, and specific crystallographic modifications. This invention also provides a low temperature, low cost, environmentally friendly flexible process for preparing titanium dioxide powders. In addition, it is easy to control the mixture ratio of rutile and anatase phase of the titanium dioxide crystallites.

The present invention relates to a process for the synthesis of titanium dioxide powders having rutile phase by $TiCl_4$ hydrolysis in vapor phase followed by low temperature calcination. The process defined herein consists of three basic steps:

(1) Hydrolyzing a reactant mixture containing $TiCl_4$ vapor, water vapor and optionally a dopant in a vapor phase reactor.

(2) Collecting titanium dioxide powder having amorphous phase formed inside the vapor phase reactor.

(3) Low temperature calcination of the collected powder.

The precise details of these steps are set forth below. Although specific executions and examples are discussed in this application, the present invention encompasses the full range of obvious variants of those specifically disclosed herein.

Hydrolyzing Step

Figure 1:
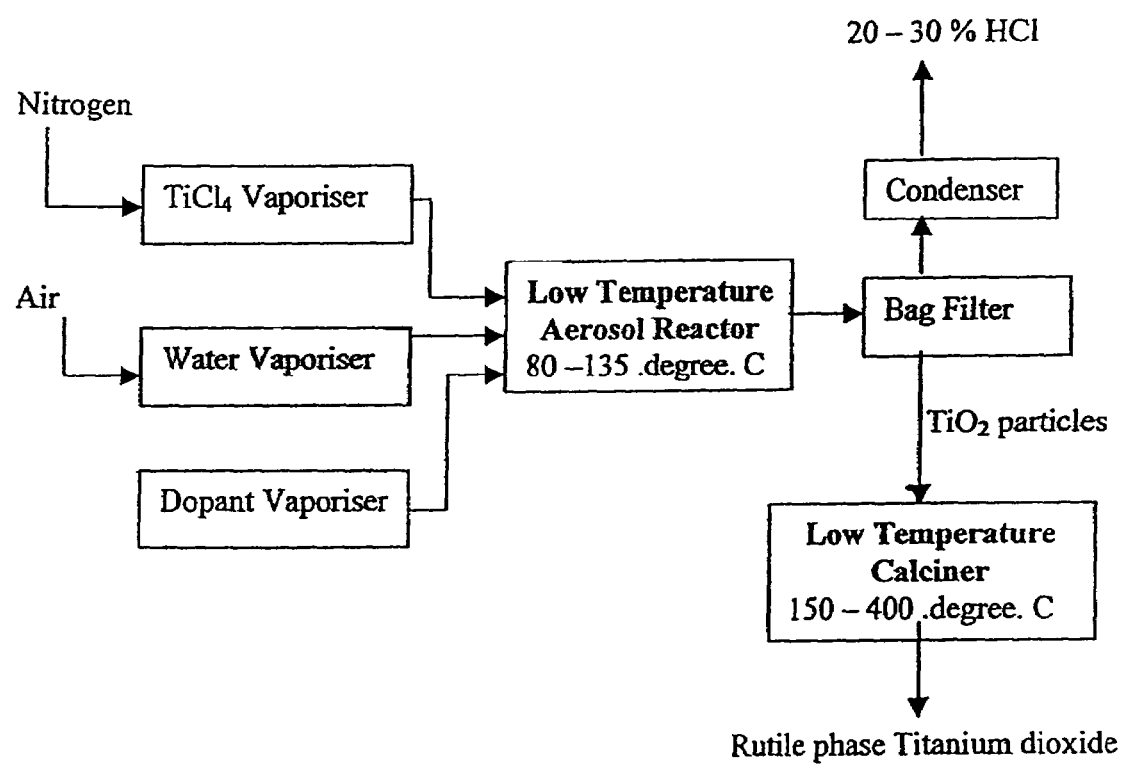
FIG. 1 represents a flow sheet of the general aspect of the rutile phase titanium dioxide synthesis using low temperature vapor phase process according to the present invention.
Figure 2:
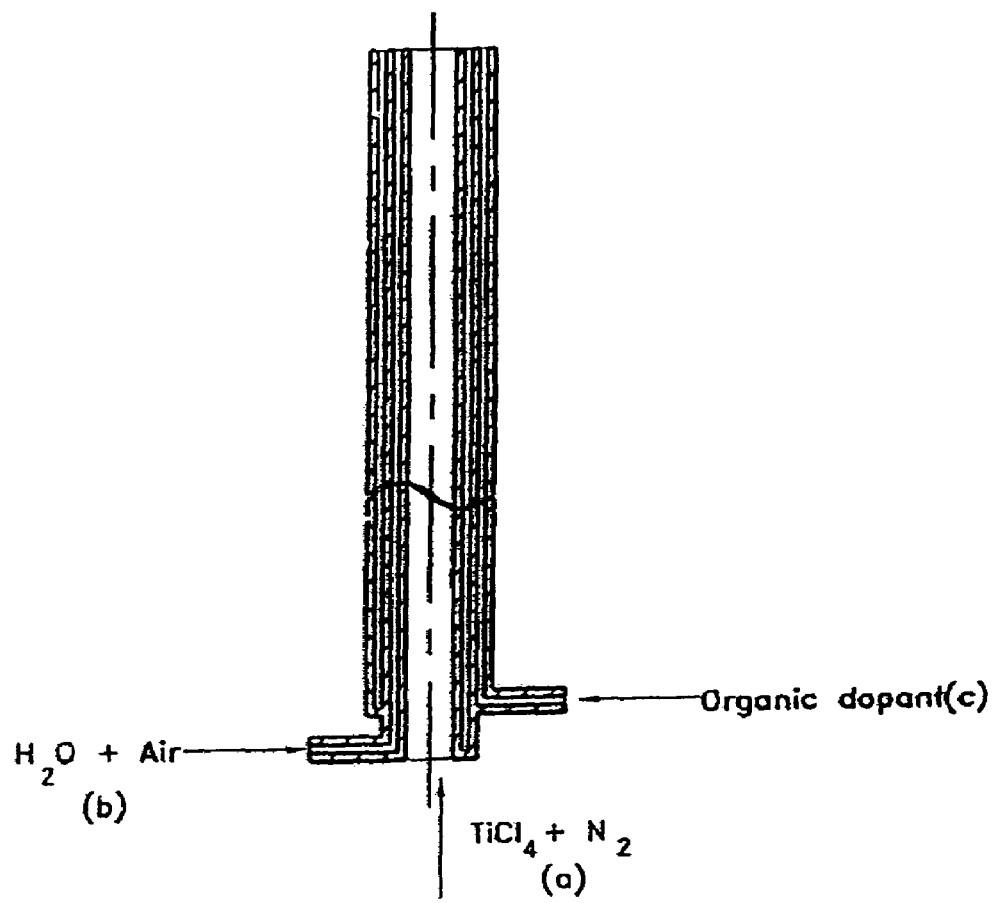
FIG. 2 represents a layout of nozzle inlet assembly for the mixing of reactants and dopant in the inlet part to the reactor.

The hydrolyzing reaction takes place in the aerosol reactor of ID 2.5 cm and 1.5 m in length, heated externally in a horizontal electrical furnace (FIG. 1). The reactor comprises a metallic tube made of Inconel® in which the reactants ($TiCl_4$, $H_2O$, and the dopant) are introduced as vapor. The aerosol reactor consists of three concentric Inconel® tubes as shown in FIG. 2. The inner diameter of the central tube is 2 mm, and the spacing between successive tubes is 1 mm, respectively. The mixture of $TiCl_4$ vapor and nitrogen is introduced through the concentric Inconel® tube (a), water vapor is introduced through the tube (b) and dopant vapor is introduced into the system through the concentric Inconel® tube (c).

The $TiCl_4$ reactant is introduced into the reactor in the vapor phase. In this invention $TiCl_4$ vapor can be generated by bubbling an inert gas through liquid $TiCl_4$, the nitrogen gas/ $TiCl_4$ vapor is preferably directed through the concentric Inconel® tube (a) of the reactor. The $TiCl_4$ flow rates utilized in the process of the present invention are generally from about 10 $cm^3$/min to about 200 $cm^3$/min. This flow rate (together with the liquid $TiCl_4$ temperature) essentially define the concentration of $TiCl_4$, which is present inside the reactor. The $TiCl_4$ vapor concentration ranges inside the reactor, which are useful in the present invention, are from about $7 \times 10^{-4}$ mol/min to about $1 \times 10^{-2}$ mol/min. Heating the $TiCl_4$ liquid through which the nitrogen gas is bubbled controls the actual concentration of $TiCl_4$ vapor in the nitrogen gas. The higher the temperature utilized, the greater the $TiCl_4$ vapor concentration achieved. In this regard, it is preferred that the $TiCl_4$ through which the nitrogen is bubbled has a temperature of about 20° C. to about 100° C.

The other required reactant utilized in the process of the invention is water vapor. Water vapor is generated by bubbling air through water and directing that gas (air with water vapor) into the reactor through the concentric Inconel® tube (b). This procedure allows for precise control of water vapor flow rate and concentration in the reactor. The air (containing water vapor) flow rate is generally from about 240 to about 1500 $cm^3$/min, preferably from about 500 to about 1000 $cm^3$/min. The reaction mixture, which is utilized in the present invention also, includes a dopant material in the vapor phase, which positively affects the physical attributes of the titanium dioxide formed. The $TiCl_4$ reactant, water vapor and the dopant may be mixed in the reactor. It is preferred that the dopant vapor be introduced through the concentric Inconel® tube (c). Aliphatic alcohols, aromatic hydrocarbons and mixtures thereof can be used as dopants, out of which ethanol is used for this present invention. In selecting the amount of dopant to the used in the process, it is generally advisable to use dopant molar concentration in the range one to ten percent of the concentration of water vapor.

Reaction

In chemical terms, the reactions being carried out in the present invention are as follows:

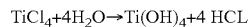

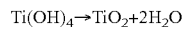

The size range of particles formed due to the above reactions can be controlled by reaction temperature and molar ratio of $H_2O/TiCl_4$ in the reactor.

Separation of Titanium Dioxide Particle from Gas Phase

The $TiO_2$ particles formed are either amorphous or anatase, and this powder is collected on a bag filter, made of Teflon® which is aided by vacuum pump. The filter bag is maintained at temperatures in the range 130 to 140° C. to avoid condensation.

Calcination

The titanium dioxide powder having amorphous phase resulting from gas phase hydrolysis of titanium chloride without dopant is calcined at a temperature in the range of 300-600° C. and for a length of time in the range of 1-4 hours to obtain rutile phase or mixtures thereof with anatase phase. In the presence of a vapor phase dopant such as ethanol during the gas phase hydrolysis, the rutile formation temperature is reduced to 150-400° C., and the calcination duration is also sufficiently shortened to limit the excessive particle growth through sintering. In comparison in the absence of dopant during the hydrolysis step, calcination temperature can range between 800° C. to 1100° C. in the gas phase hydrolysis for anatase to rutile transformation. In the presence of dopant, anatase to rutile transformation takes place during the vapor phase hydrolysis, and calcination temperature range can be reduced to between 500 and 700° C.

The following illustrative examples are not intended to restrict the scope of the present invention. The following examples also illustrate the unique advantage of using dopants during the hydrolysis in the process of this invention.

Comparative Example 1 illustrates the vapor phase hydrolysis of $TiCl_4$ and water without any dopant to synthesize titania nanopowders having the rutile phase.

Example 2 illustrates the vapor phase hydrolysis of $TiCl_4$ and water with dopant as ethanol to synthesize titania nanopowders having the rutile phase.

COMPARATIVE EXAMPLE 1

Dry nitrogen (99.9%) is bubbled through a gas bottle containing titanium tetrachloride (commercial grade) maintained at a temperature of 90° C. and is directed through the central tube of the aerosol reactor. Concentration of $TiCl_4$ in the gas stream is determined by recording the weight of $TiCl_4$ before and after each experiment. A constant $N_2$ flow rate of 500 $cm^3$/min through the $TiCl_4$ bubbler is used. The corresponding molar flow rate of $TiCl_4$ is $1.7 \times 10^{-3}$ mol/min. Air is bubbled through a gas washed bottle containing water (temperature=90° C.) and is directed through the second tube of the nozzle distributor. Mass flow controllers (1259 B, MKS) precisely control all flows into reactor. The $TiCl_4$ vapor and the water vapor are mixed rapidly around the nozzle and form $TiO_2$ aerosol at near atmospheric pressure. Titanium dioxide particles produced by gas phase hydrolysis of $TiCl_4$ in the aerosol reactor are collected in a bag filter made of Teflon®. The titanium dioxide powder is obtained directly as a dry powder for characterization. The exhaust gas is completely absorbed by a set of bubblers. Portions of the titanium dioxide powder produced was heat treated in a conventional muffle furnace. The powder was calcined at 800° C. for 3 hrs. A rotameter is used for measuring the flow rate of air.

$TiO_2$ is synthesized (without the use of dopants), in this example, using the following range of reaction conditions.

Inlet gas stream temperature=70-80° C.

Exit gas stream temperature=130-150° C.

Air flow rate=1000.00 $cm^3$/min. (STP)

$TiCl_4$ molar flow rate=$1.7 \times 10^{-3}$ mol/min.

$H_2O/TiCl_4$ molar ration=15

Phase composition of collected particles was determined by X-ray diffraction (XRD) in a Philips Holland Exper-Pro diffractometer operating at 40 kV, 20 mA, using $CuK_\alpha$ Radiation. Weight fractions of the rutile and anatase phases in samples are calculated from the relative intensities of strongest peaks corresponding to anatase ($2\theta=25.6$ for the (101) reflection of anatase) and rutile ($2\theta=27.5$ for the (110) reflection of rutile) peaks as described by Spurr and Myers, Quantitative Analysis of Anatase-Rutile Mixture with an X-ray Diffractometer, Analytical Chem., 29: 760 (1957). Specific surface area of the powder is measured using a BET Nitrogen adsorption apparatus (Gemin 2375 V4.02). Scanning Electron Microscopy SEM-JIOL: 1.5 kV) is used for morphological analysis of the powder.

Titanium dioxide powders synthesized at different molar ratios of $TiCl_4$ and water vapor in the reactor are given in Table 1 below. Table 2 shows the specific surface areas of the powders produced, as well as the, rutile and anatase contents of those powders. Powders produced at the various molar ratios are designated as H1, H2, H3 and H4.

TABLE 1

Aerosol Synthesis Condition of $TiO_2$ powder (Without gas phase dopant)

| Powder | Temperature, ° C. | Molar flow rate of $TiCl_4$ | $H_2O/TiCl_4$ molar ratio |
|---|---|---|---|
| H1 | 135 | 0.0026 | 14 |
| H2 | 135 | 0.0015 | 20 |
| H3 | 135 | 0.0007 | 33 |
| H4 | 135 | 0.0013 | 49 |

TABLE 2

Characteristics of Titanium Dioxide powder

| Powder No. | BET Surface Area $m^2$/g) | Avg. particle (nm*) | Rutile content, wt % | Anatase content, wt % |
|---|---|---|---|---|
| H1 | 19 | 81 | >99.9 | <0.1 |
| H2 | 22 | 69 | 87.0 | 13.0 |
| H3 | 30 | 51 | 76.0 | 24.0 |
| H4 | 33 | 46 | 21.0 | 79.0 |

*Based on BET surface area

EXAMPLE 2

Using the reactor and the analytical methods of Comparative Example 1, doped titanium dioxide was prepared as follows. The dopant ethanol kept at room temperature (28° C.) is introduced into the reactor through the third concentric tube. $TiCi_4$ vapor, water vapor and ethanol are mixed rapidly around the nozzle and form $TiO_2$ aerosol at near atmospheric pressure. Ethanol molar concentration is in the range of one to ten percent of the concentration of water vapor. Portions of the powders produced were heat treated in a conventional furnace. The powder was calcined at 500° C. for 3 hrs.

Titanium dioxide powder is synthesized at different molar ratios of $H_2O/TiCl_4$ in the reactor given in Table 3 below. Table 4 shows the specific surface area of the powders produced as well as the rutile and anatase contents of these powders. Powders produced at the various molar ratios are designated as EH1, EH2 EH3 and EH4.

TABLE 3

Aerosol Synthesis Condition of Titanium Dioxide powder (with gas phase dopant)

| Powder | Temperature, ° C. | $H_2O/TiCl_4$ molar ratio | $H_2O/TiCl_4$ molar ratio |
|---|---|---|---|
| EH1 | 137 | 14 | 7.0 |
| EH2 | 137 | 20 | 6.0 |
| EH3 | 137 | 33 | 3.5 |
| EH4 | 137 | 49 | 3.0 |

TABLE 4

Characteristics of Titanium Dioxide powder

| Powder No. | BET Surface Area ($m^2$/g) | Avg. particle size, nm* | Rutile content, wt % | Anatase content, wt % |
|---|---|---|---|---|
| EH1 | 43.5 | 35 | >99.9 | <0.1 |
| EH2 | 39.6 | 39 | 87.0 | 13.0 |
| EH3 | 36.0 | 43 | 76.0 | 24.0 |
| EH4 | 33.0 | 47 | 51.0 | 49.0 |

*Based on Bet surface area

TABLE 5

Comparison of rutile transition temperature observed with and without the dopant

| Gas stream temp, ° C. | $H_2O/TiCl_4$ molar ratio | $H_2O/$ Ethanol Molar ratio | Titanium Dioxide particles Obtained From vapor Phase hydrolysis | Commencement of phase Transformation on to rutile temperature. ° C. | Completion of phase transformation on to rutile, temperature. ° C.* |
|---|---|---|---|---|---|
| 80 | 12 | — | Amorphous | 300 | 600 |
| 80 | 12 | 7.4 | Amorphous | 150 | 400 |
| 137 | 15 | — | Anatase | 800 | 1100 |
| 137 | 15 | 7.0 | Anatase | 500 | 700 |

Calcined duration: 3 hrs.

Table 5 illustrates the unique advantage of using dopant such as ethanol during the vapor phase hydrolysis step to achieve substantial reduction of the calcination temperature required for obtaining titanium dioxide particles with rutile phase.

1. Nano and sub micron size titanium dioxide particles having the rutile phase, anatase phase and mixtures thereof could be synthesized at temperatures less than 400° C. through vapor phase reaction with $TiCl_4$ as the precursor.
2. The other reactants involved in the process are water and ethanol, which are of low cost and are environmentally green chemicals.
3. The process is less energy consuming than other available process and involves negligible maintenance.

Prior art processes, such as the chloride process developed for rutile manufacture (by Dupont), involve oxidation of titanium tetrachloride, at a temperature of 1000-1200° C. The high purity oxygen is obtained through cryogenic air separation and the reaction is highly exothermic leading to release of large amount of energy (−130.98 KJ/mol at 1100° C.) which is removed from the reactor through heat exchangers containing cooling water. The high energy consumption and wastage in this process is due to 1. The energy required for cryogenic separation of high purity oxygen from air
2. Pre-heating of $TiCl_4$ and oxygen to 1200° C.
3. Wastage of exothermic heat of reaction.

The process of the present invention does not require pure oxygen, and the maximum reaction temperature in the aerosol reactor can be controlled to about 150° C. The reduced energy consumption is due to the absence of energy requirement of cryogenic oxygen separation and negligible preheat temperature of only 150° C. Additionally, there is no need for heat exchangers since the $TiCl_4$ hydrolysis reaction has a much lower exothermic heat of reaction (−20 kJ/mol at 150° C.).

The significance of the role played by ethanol to reduce the temperature of conversion of amorphous precursor to rutile is very clearly indicated in the XRD of the amorphous precursors. Specifically the XRD of the amorphous precursor synthesized with ethanol as dopant contains rutile fingerprints having shallow and broad peaks typical of non-crystallinity. However these features are absent in the XRD of amorphous precursors generated without ethanol. Without wishing to be bound by any theory, it is believed that the use of organic dopant influences the nucleation process of titanium dioxide powder by generating unique solid structures capable of being converted to rutile phase under mild calcination temperatures.

We claim:

1. A process for synthesis of ultrafine rutile phase titanium dioxide particles through vapor phase hydrolysis of titanium tetrachloride comprising the steps of:
   (a) hydrolyzing a mixture of $TiCl_4$ and $H_2O$ and a dopant in vapour phase in an aerosol reactor;
   (b) collecting amorphous or anatase titanium dioxide powder formed as dry powders; and
   (c) calcining the dry powder to obtain rutile phase titanium dioxide,
   wherein the amorphous particles of titanium dioxide are calcined at a temperature in the range of 150 to 400° C. and for a period in the range of 1 to 4 hrs to generate rutile particles.

2. A process as claimed in claim 1 wherein the dopant contains a carbon atom and is selected from the group consisting of an aliphatic alcohol, an aromatic hydrocarbon, and any mixture thereof.

3. A process as claimed in claim 2 wherein the dopant is ethanol.

4. A process as claimed in claim 1 wherein the molar concentration of the dopant is 1 to 10 based on the water vapour.

5. A process as claimed in claim 1 wherein the reaction mixture contains from 1 to 10% ethanol on a molar basis based on $TiCl_4$.

6. A process as claimed in claim 1 wherein the flow rate of $TiCl_4$ is in the range of 10 $cm^3$/min to 200 $cm^3$/min.

7. A process as claimed in claim 1 wherein the $TiCl_4$ vapor concentration inside the reactor is in the range of $7 \times 10^{-4}$ mol/min to $1 \times 10^{-2}$ mol/min.

8. A process as claimed in claim 1 wherein the flow rate of water vapour is in the range of 240 to 1500 $cm^3$/min, preferably from 500 to 1000 $cm^3$/min.

9. A process as claimed in claim 1 wherein the temperature at the exit of the aerosol reactor is maintained at less than 100° C.

10. A process as claimed in claim 1 wherein the aerosol reactor is externally heated in order to avoid particle coating on the walls through thermophoresis.

11. A process as claimed in claim 1 wherein the aerosol reactor comprises of 3-tube concentric jet assembly wherein $TiCl_4$ is introduced into the innermost tube, dopant is introduced into the outermost tube and water vapor is introduced into the middle tube.

12. A process as claimed in claim 11 wherein the 3-tube assembly comprises a concentric arrangement of three inconel tubes at the entrance of the aerosol reactor.

13. A process as claimed in claim 11 wherein vapor phase $TiCl_4$ is introduced into a center tube of the three concentric inconel tubes.

14. A process as claimed in claim 1 wherein the vapor phase $TiCl_4$ is formed by bubbling an inert gas through $TiCl_4$ liquid.

15. A process as claimed in claim 14 wherein the inert gas is selected from the group consisting of argon, nitrogen, krypton, helium and any mixture thereof.

16. A process as claimed in claim 1 wherein the molar ratio of water to titanium tetra chloride in the feed is in the range 10 to 15.

17. A process as claimed in claim 1 wherein the water vapor is formed by bubbling air or inert gases through water under superheated condition.

18. A process as claimed in claim 1 wherein the reactor wall temperature is from 200 to 450° C.

19. A process as claimed in claim 1 wherein the rutile titanium dioxide particles formed have an average diameter in the range of from 25 to 150 nanometers.

20. A vapor phase process for the synthesis of ultrafine rutile titanium dioxide powders carried out in an aerosol reactor comprising the steps of:
   (a) vaporizing a titanium chloride liquid, water and dopant such as ethanol separately for generating a reactant mixture;
   (b) hydrolyzing $TiCl_4$, $H_2O$ and dopant in vapour phase mixture in a continuous aerosol reactor under non-isothermal conditions at a temperature in the range of 80 to 137° C.;
   (c) collecting amorphous and anatase phase titanium dioxide powder as dry powder;
   (d) calcining the titanium dioxide particles having the amorphous phase in the temperature ange of 150-400° C. and time duration in the range of 1 to 4 hrs. to obtain titanium dioxide particles with rutile phase.

* * * * *